(12) United States Patent
Xiong

(10) Patent No.: US 10,593,334 B2
(45) Date of Patent: Mar. 17, 2020

(54) METHOD AND APPARATUS FOR GENERATING VOICEPRINT INFORMATION COMPRISED OF REFERENCE PIECES EACH USED FOR AUTHENTICATION

(71) Applicant: ALIBABA GROUP HOLDING LIMITED, George Town, Grand Cayman (KY)

(72) Inventor: Jian Xiong, Zhejiang (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/484,082

(22) Filed: Apr. 10, 2017

(65) Prior Publication Data

US 2017/0221488 A1 Aug. 3, 2017

Related U.S. Application Data

(63) Continuation of application No. PCT/CN2015/091260, filed on Sep. 30, 2015.

(30) Foreign Application Priority Data

Oct. 10, 2014 (CN) .......................... 2014 1 0532530

(51) Int. Cl.
*G10L 17/00* (2013.01)
*G06F 21/32* (2013.01)
(Continued)

(52) U.S. Cl.
CPC .............. *G10L 17/22* (2013.01); *G10L 15/26* (2013.01); *G10L 17/00* (2013.01); *G10L 17/005* (2013.01);
(Continued)

(58) Field of Classification Search
CPC ........ G10L 17/005; G10L 17/24; G06F 21/32
See application file for complete search history.

(56) References Cited

U.S. PATENT DOCUMENTS 7,158,776 B1 1/2007 Estes et al.
7,386,448 B1 6/2008 Poss et al.
(Continued)

FOREIGN PATENT DOCUMENTS

CN 1547191 A 11/2004
CN 1808567 A 7/2006
(Continued)

OTHER PUBLICATIONS

Step-by-Step and integrated approaches in broadcast news speaker diarization, Sylvain Meignier et al., Computer Speech and Language 20 (2006) 303-330.*
(Continued)

*Primary Examiner* — Farzad Kazeminezhad
(74) *Attorney, Agent, or Firm* — Finnegan, Henderson, Farabow, Garrett & Dunner, LLP

(57) ABSTRACT

A method for generating voiceprint information is provided. The method includes acquiring a historical voice file generated by a call between a first user and a second user; executing text recognition processing on the voice information to obtain text information corresponding to the voice information; and storing the voice information and the corresponding text information as reference voiceprint information of the first user, and storing an identifier of the first user. Furthermore each voiceprint information comprises a plurality of pieces of reference voiceprint information, each of which is sufficient to authenticate a user.

24 Claims, 9 Drawing Sheets

(51) Int. Cl.
  *G10L 17/24* (2013.01)
  *G10L 17/22* (2013.01)
  *G10L 15/26* (2006.01)
  *G10L 17/02* (2013.01)
  *G10L 17/04* (2013.01)
  *G10L 17/06* (2013.01)

(52) U.S. Cl.
  CPC .............. *G10L 17/02* (2013.01); *G10L 17/04* (2013.01); *G10L 17/06* (2013.01); *G06F 21/32* (2013.01); *G10L 17/24* (2013.01)

(56) References Cited

U.S. PATENT DOCUMENTS

| | | | |
|---|---|---|---|
| 7,536,304 | B2 | 5/2009 | Di Mambro et al. |
| 7,814,332 | B2 | 10/2010 | Beenau et al. |
| 8,812,320 | B1 | 8/2014 | Roblek et al. |
| 2006/0020460 | A1 | 1/2006 | Itou |
| 2006/0029190 | A1 | 2/2006 | Schultz |
| 2006/0277043 | A1 | 12/2006 | Tomes et al. |
| 2006/0286969 | A1 | 12/2006 | Talmor et al. |
| 2007/0168190 | A1* | 7/2007 | Itagaki ............... G07C 9/00158 704/246 |
| 2008/0256613 | A1 | 10/2008 | Grover |
| 2010/0086108 | A1* | 4/2010 | Jaiswal ................ G10L 17/005 379/88.04 |
| 2010/0153108 | A1 | 6/2010 | Szalai et al. |
| 2011/0213615 | A1 | 9/2011 | Summerfield et al. |
| 2012/0130714 | A1 | 5/2012 | Zeljkovic et al. |
| 2014/0142940 | A1 | 5/2014 | Ziv et al. |
| 2014/0359736 | A1 | 12/2014 | Harty et al. |
| 2014/0379354 | A1* | 12/2014 | Zhang .................... G10L 17/24 704/275 |
| 2015/0067822 | A1* | 3/2015 | Randall ................. G06F 21/32 726/17 |

FOREIGN PATENT DOCUMENTS

| | | |
|---|---|---|
| CN | 1852354 A | 10/2006 |
| CN | 102222502 A | 10/2011 |
| CN | 102404287 A | 4/2012 |
| CN | 102708867 A | 10/2012 |
| CN | 102760434 A | 10/2012 |
| CN | 103258535 A | 8/2013 |
| KR | 10-2013-0075513 | 7/2013 |
| WO | WO 2016/054991 A1 | 4/2016 |

OTHER PUBLICATIONS

Extended European Search Report in European Application No. 15848463.4-1901 / 3206205 (PCT/CN2015091260), pursuant to Rule 62 EPC, the Supplementary European Search Report (Art 153(7) EPC) and the European Search Opinion, dated Oct. 5, 2017 (9 pgs.).

PCT International Search Report issued in International Application No. PCT/CN2015/091260 dated Jan. 12, 2016 (4 pages).

State Intellectual Property Office of People's Republic of China Chinese Search Report issued in Application No. 2014105325300, dated Dec. 13, 2018, 1 page.

State Intellectual Property Office of People's Republic of China First Chinese Office Action issued in Application No. 2014105325300, dated Dec. 21, 2018, 13 pages.

Sylvain Meignier et al, "Step-by-Step and Integrated Approaches in Broadcast News Speaker Diarization," Computer Speech and Language, 20 (2006) 303-330; 2006 Elsevier Ltd. (28 pages).

(KIPO) Korean Application No. 10-2017-7012683, Notice of Preliminary Rejection dated Jul. 21, 2019 (15 pages).

\* cited by examiner

METHOD AND APPARATUS FOR GENERATING VOICEPRINT INFORMATION COMPRISED OF REFERENCE PIECES EACH USED FOR AUTHENTICATION

CROSS-REFERENCE TO RELATED APPLICATIONS

This application claims priority to International Application No. PCT/CN2015/091260, filed Sep. 30, 2015, which is based on and claims priority from Chinese Patent Application No. 201410532530.0, filed Oct. 10, 2014, both of which are incorporated herein by reference in their entireties.

TECHNICAL FIELD

The present invention relates to the field of voiceprint recognition and, in particular, to a method and apparatus for generating voiceprint information.

BACKGROUND

Voiceprint refers to a sound wave spectrum displayed by an electro-acoustic instrument that carries verbal information. The sound waves generated by different people speaking the same words are different, and the corresponding sound wave spectrum, i.e., voiceprint information, are also different. Therefore, by comparing voiceprint information, it can be determined whether the corresponding speakers are the same, and identity authentication based on voiceprint recognition can be implemented. The identity authentication method using voiceprint recognition can be applied to various account management systems for ensuring the security of accounts.

Generally, before identity authentication is implemented by utilizing the voiceprint recognition technique, a user needs to read out pre-set text information, and a voice signal of the user is collected and analyzed to obtain corresponding voiceprint information which serves as reference voiceprint information of the user and is stored in a voiceprint library. When identity authentication is being implemented, a person to be authenticated is also required to read out the above pre-set text information, and a voice signal of the person to be authenticated is collected and analyzed to obtain corresponding voiceprint information. By comparing the voiceprint information with the reference voiceprint information in the voiceprint library, it can be determined whether the person to be authenticated is the user.

In the above described method, text information for identity authentication has been disclosed when the voiceprint library is established, and accordingly, the text information that the person to be authenticated is required to read out during identity authentication is also known. If a voice file of the user reading out the text information has been recorded in advance, then another person can be authenticated successfully by playing the voice file which is recorded in advance. It can be seen that the a potential security hazard exists in the identity authentication method using voiceprint recognition.

SUMMARY

The present disclosure provides a method for generating voiceprint information. Consistent with some embodiments, the method includes acquiring a historical voice file generated by a call between a first user and a second user; executing text recognition processing on the voice information to obtain text information corresponding to the voice information; and storing the voice information and the corresponding text information as reference voiceprint information of the first user, and storing an identifier of the first user.

Consistent with some embodiments, this disclosure provides a system for generating voiceprint information. The system includes a voice filter configured to acquire a historical voice file generated by a call between a first user and a second user, and execute filtering processing on the historical voice file to obtain voice information of the first user; a text recognizer configured to execute text recognition processing on the voice information to obtain text information corresponding to the voice information; and a voiceprint generator configured to store the voice information and the corresponding text information as reference voiceprint information of the first user, and store an identifier of the first user.

Consistent with some embodiments, this disclosure provides an identity authentication method. The identity authentication method includes acquiring a historical voice file generated by a call between a first user and a second user; executing filtering processing on the historical voice file to obtain voice information of the first user; storing the voice information and the corresponding text information as reference voiceprint information of the first user, and storing an identifier of the first user; acquiring reference voiceprint information corresponding to an identifier of a user to be authenticated; outputting text information in the acquired reference voiceprint information, and receiving voice information to be authenticated; comparing voice information in the acquired reference voiceprint information with the voice information to be authenticated; if the voice information in the acquired reference voiceprint information matches with the voice information to be authenticated, determining that the authentication of the user succeeds; and if the voice information in the acquired reference voiceprint information does not match with the voice information to be authenticated, determining that the authentication of the user fails.

Consistent with some embodiments, this disclosure provides an identity authentication system. The identity authentication system includes a voice filter configured to acquire a historical voice file generated by a call between a first user and a second user, and execute filtering processing on the historical voice file to obtain voice information of the first user; a text recognizer configured to execute text recognition processing on the voice information to obtain text information corresponding to the voice information; a voiceprint generator configured to store the voice information and the corresponding text information as reference voiceprint information of the first user, and store an identifier of the first user; a voiceprint extractor configured to acquire reference voiceprint information corresponding to an identifier of a user to be authenticated; a user interface configured to output text information in the acquired reference voiceprint information, and receive voice information to be authenticated; and a voiceprint matcher configured to compare voice information in the acquired reference voiceprint information with the voice information to be authenticated, the voiceprint matcher further configured to determine that the authentication of the user succeeds if the voice information in the acquired reference voiceprint information matches with the voice information to be authenticated, and determine that the authentication of the user fails if the voice information in the acquired reference voiceprint information does not match with the voice information to be authenticated.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
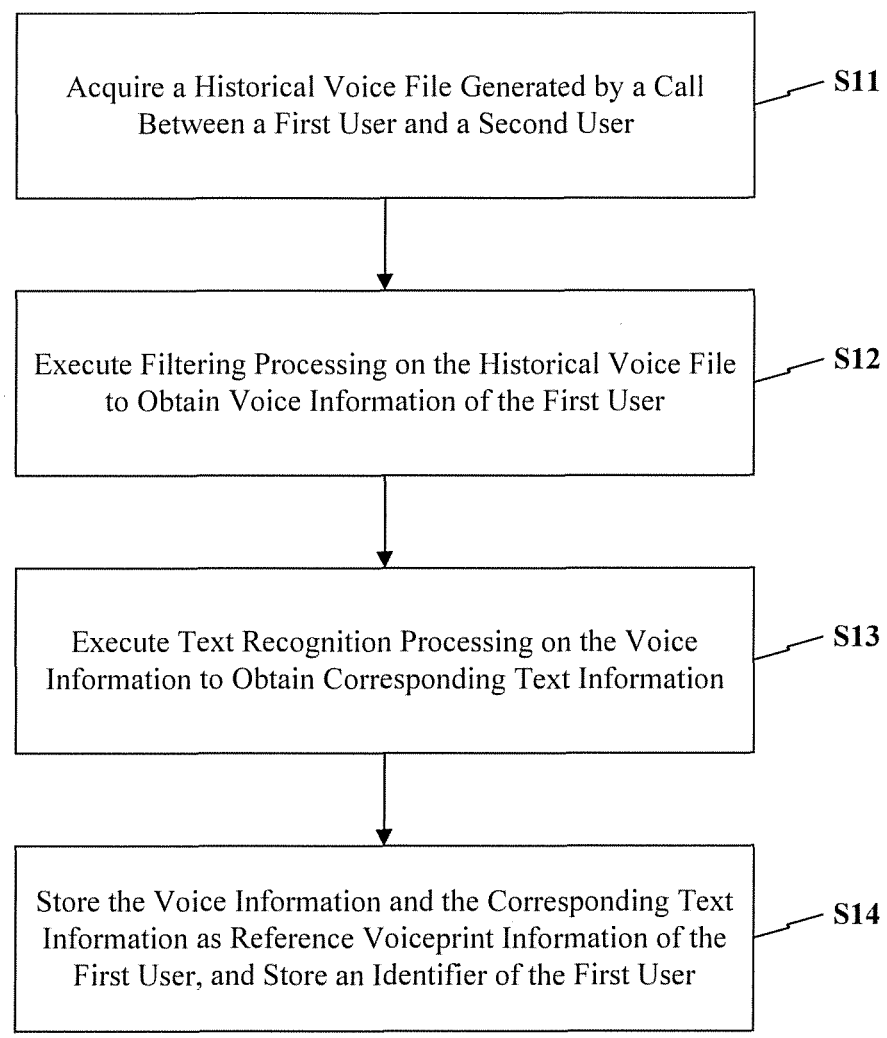
FIG. 1 is a flowchart of an exemplary method for generating voiceprint information, consistent with some embodiments of this disclosure.

FIG. 1 is a flowchart of an exemplary method 100 for generating voiceprint information, consistent with some embodiments of this disclosure. The method 100 may be performed by a system, such as an account management system. Referring to FIG. 1, the method 100 includes the following steps.

In step S11, the account management system acquires a historical voice file generated by a call between a first user and a second user.

For example, the first user may be a registered user who has a corresponding private account in the account management system, and the second user may be a service staff of the account management system.

In step S12, the account management system executes filtering processing on the historical voice file to obtain voice information of the first user.

In step S13, the account management system executes text recognition processing on the voice information to obtain corresponding text information.

In step S14, the account management system stores the voice information and the corresponding text information as reference voiceprint information of the first user, and stores an identifier of the first user.

In some implementations, in order to facilitate performance statistics, service quality evaluation, dispute handling, etc., the account management system may record the voice call process between a registered user and a service staff and store the corresponding voice file. In some embodiments, the method 100 includes filtering out a machine prompt tone and service staff sound information in the historical voice file stored in the account management system to obtain voice information of the registered user, and performing text recognition processing on the voice information to obtain corresponding text information. The voice information and the corresponding text information can serve as reference voiceprint information of the registered user. The steps S11-S14 can be executed with regard to each registered user respectively to obtain reference voiceprint information corresponding to each registered user, so as to build a voiceprint library.

It can be seen from the above method that the embodiments of the present application involve filtering a historical voice file stored in a relevant system to obtain voice information of a first user, obtaining text information corresponding to the voice information by means of text recognition processing, and editing the voice information and the corresponding text information into reference voiceprint information of the first user. In the method 100, the text information and the voice information in the reference voiceprint information are both obtained on the basis of the historical voice file rather than being pre-set by the relevant system. As a result, the text information and the voice information in the reference voiceprint information are not disclosed, and neither the first user nor any other user would foresee the specific content of text information which needs to be read during identity authentication and play a voice file recorded in advance. Therefore, the method 100 improves accuracy of the authentication result and security of user accounts in identity authentication.

In some embodiments, a historical voice file corresponding to a call process between the first user and the second user may be acquired randomly, so that an identifier in the voiceprint library corresponds to a piece of reference voiceprint information. Since it cannot be foreseen to which call process the actually acquired historical voice file corresponds, the specific content of text information in the obtained reference voiceprint information cannot be foreseen, thereby improving the accuracy of the authentication result and the security of an account.

In other embodiments, all the historical voice files corresponding to the first user may be acquired, so that one identifier in the voiceprint library may correspond to a plurality of pieces of reference voiceprint information.

There may be a plurality of pieces of reference voiceprint information corresponding to the first user, and accordingly, any piece of reference voiceprint information can be acquired randomly to execute identity authentication. Since text information in each piece of reference voiceprint information is not previously disclosed, a person to be authenticated would not be able to record a corresponding voice file in advance, thereby improving the accuracy of the authentication result and the security of an account.

Figure 2:
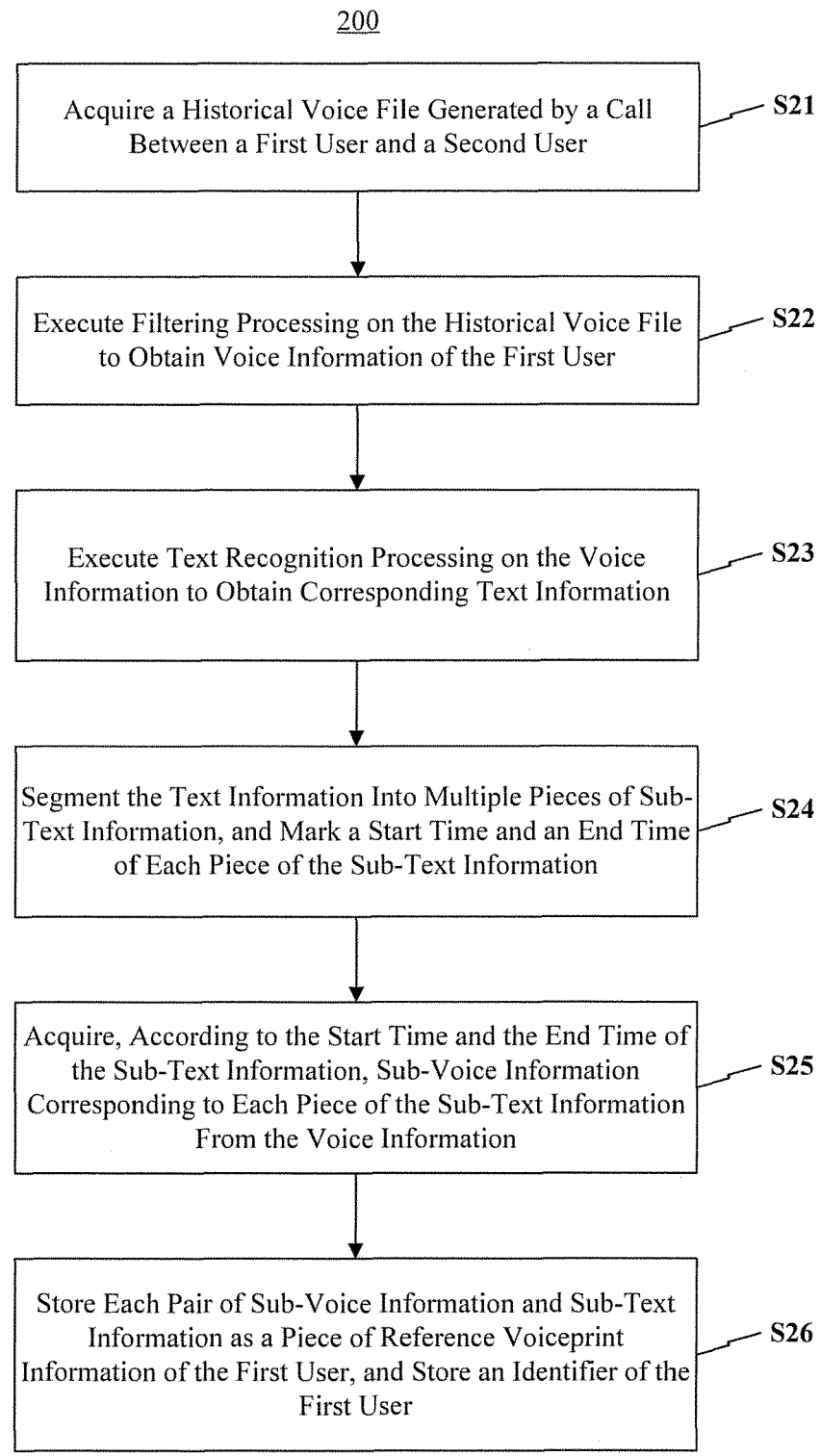
FIG. 2 is a flowchart of another exemplary method for generating voiceprint information, consistent with some embodiments of this disclosure.

FIG. 2 is a flowchart of another exemplary method 200 for generating voiceprint information, consistent with some embodiments of this disclosure. The method 200 can be performed by a system, such as an account management system. Referring to FIG. 2, the method 200 includes the following steps.

In step S21, the account management system acquires a historical voice file generated by a call between a first user and a second user.

In step S22, the account management system executes filtering processing on the historical voice file to obtain voice information of the first user.

In step S23, the account management system executes text recognition processing on the voice information to obtain corresponding text information.

In step S24, the account management system segments the text information into multiple sub-text information, and marks a start time and an end time of each piece of the sub-text information. Each piece of sub-text information may be a sentence, a phrase, or a word.

In step S25, the account management system acquires, according to the start time and the end time of the sub-text information, sub-voice information corresponding to each piece of the sub-text information from the voice information.

In step S26, the account management system stores each pair of sub-voice information and sub-text information as a piece of reference voiceprint information of the first user, and stores an identifier of the first user.

Since the historical voice file is a call recording file between the first user and the second user within a period of time, the voice information obtained by filtering contains a plurality of segments of voice information of the first user, and accordingly, the text information obtained by text recognition contains a plurality of sentences or phrases. The embodiments of the present application involve segmenting text information into multiple pieces of sub-text information (each piece of sub-text information may be a sentence, a phrase or a word); and at the same time, the start time and the end time of each piece of sub-text information obtained by segmentation are marked, and sub-voice information corresponding to the sub-text information is cut out from the voice information according to the start time and the end time (that is, voice information is segmented according to the sub-text information). For example, the sentence "my account is locked" in text information is obtained by recognition from the time period of 00:03 to 00:05 of voice information. Then the sentence "my account is locked" is segmented into one piece of sub-text information, with the start time and the end time being 00:03 and 00:05. Accordingly, the voice information at the time period of 00:03 to 00:05 in the voice information is obtained, and then sub-voice information corresponding to the sub-text information "my account is locked" is obtained. By segmenting text information and voice information, a plurality of pairs of sub-text information and sub-voice information can be obtained, and each pair is stored as a piece of reference voiceprint information according to a pre-determined format, thereby multiple pieces of reference voiceprint information corresponding to the same user are obtained.

In some embodiments, storing the sub-voice information and the corresponding sub-text information as a piece of reference voiceprint information may include processing the sub-voice information into corresponding sub-voiceprint information, setting a file name for the sub-voiceprint information, and storing the sub-voiceprint information and corresponding sub-text information. The format of the file name can be "voiceprint number.file format postfix," such as 0989X.WAV. An example storage structure of the voiceprint library is shown in Table 1.

TABLE 1

Example of storage structure of voiceprint library

| User ID | User voiceprint number | Sub-text information | Sub-voiceprint information |
|---|---|---|---|
| 139XXXXXXXX | 1 | Very satisfied | 0989X.WAV |
| 139XXXXXXXX | 2 | Why haven't refunded yet | 0389X.WAV |
| 189XXXXXXXX | 1 | I'm very angry | 0687X.WAV |
| 189XXXXXXXX | 2 | Account is locked | 0361X.WAV |

In Table 1, each row corresponds to one piece of reference voiceprint information in the voiceprint library. The identifier (i.e., user ID) is used as the primary key for voiceprint information query and call, and the user voiceprint number is used for marking the number of pieces of reference voiceprint information corresponding to the same user ID. Taking the user ID "139XXXXXXXX" as an example, when an identity authentication request with regard to the user ID is received, reference voiceprint information corresponding to "139XXXXXXXX" is queried in the voiceprint library above, and a plurality of query results can be obtained. One piece of reference voiceprint information is randomly selected therefrom as reference voiceprint information of the present authentication. For example, reference voiceprint information No. 2 corresponding to the user ID is selected as reference voiceprint information of the present authentication. The account management system outputs sub-text information "why haven't refunded yet" and receives voice information that is obtained by a user reading the sub-text information. The received voice information is processed as voiceprint information which is compared with sub-voiceprint information "0389X.WAV" extracted from the voiceprint library. If the two match with each other, then it is determined that identity authentication succeeds, i.e., it is considered that the user to be authenticated is the first user corresponding to "139XXXXXXXX." If the two do not match with each other, then it is determined that identity authentication fails.

It can be seen from the above technical solution that the embodiments of the present application involve filtering a historical voice file stored in a system to obtain voice information of a first user, obtaining corresponding text information by performing text recognition processing on the voice information, segmenting the recognized text information into multiple pieces of sub-text information, cutting out corresponding sub-voice information from the above voice information according to the start time and the end time of each piece of the sub-text information, editing each pair of sub-text information and sub-voice information into one piece of reference voiceprint information respectively, and storing the same in a voiceprint library. In the method 200, the account management system may store multiple pieces of reference voiceprint information for a user. When identity authentication needs to be executed, one piece of reference voiceprint information is randomly selected from multiple pieces of reference voiceprint information corresponding to an identifier. Since the reference voiceprint information is randomly acquired, the specific content of text information that the user needs to read cannot be foreseen, thereby improving the accuracy of the authentication result and the security of an account. In addition, in the method 200, sub-text information in each piece of reference voiceprint information is relatively simple, which can reduce the time required for reading the text information, reduce the time consumed by voiceprint comparison, and improve the authentication efficiency.

In some embodiments, the voiceprint library may be updated. For example, reference voiceprint information corresponding to a new user, and new reference voiceprint information for an existing user may be added. With regard to a new user, steps S12 to S14 or steps S22 to S26 above may be executed to obtain the corresponding reference voiceprint information. With lapse of time, the historical voice files corresponding to the same user may increase. Thus, with regard to the existing user, a corresponding newly-added historical voice file can be acquired and the steps above are executed, and then new reference voiceprint information can be added for the existing user.

Figure 3:
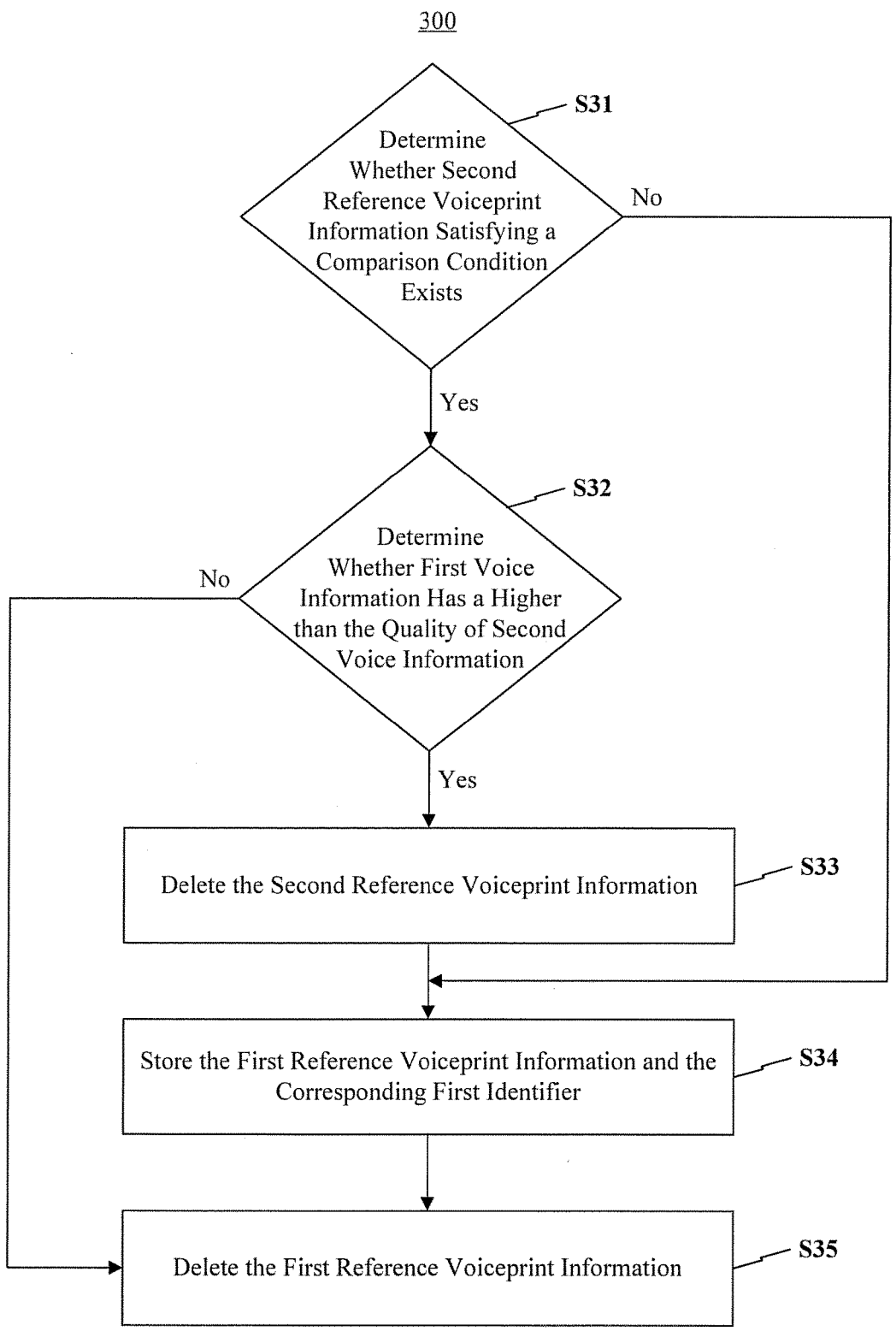
FIG. 3 is a flowchart of an exemplary method for storing reference voiceprint information, consistent with some embodiments of this disclosure.

When multiple pieces of reference voiceprint information is set for the same first user, it needs to ensure that text information in any two pieces of reference voiceprint information corresponding to the first user is different. However, in practical applications, text information of the same content may be recognized from different historical voice files, and multiple pieces of sub-text information of the same content may be segmented from the same text information. As a result, the same sub-text information may correspond to multiple pieces of sub-voice information. FIG. 3 is a flowchart of an exemplary method 300 for storing reference voiceprint information, consistent with some embodiments of this disclosure. The method 300 may be performed by a system, such as an account management system. For the convenience of description, reference voiceprint information to be stored is referred to as first reference voiceprint information, and the first reference voiceprint information includes first text information and first voice information. Referring to FIG. 3, the method 300 includes the following steps.

In step S31, the account management system determines whether a second reference voiceprint information satisfying a comparison condition exists. If a second reference voiceprint information satisfying a comparison condition exists, then the account management system executes step S32; otherwise, the account management system executes step S34.

In some embodiments, the comparison condition includes: second text information corresponding to the second reference voiceprint information being the same as the first text information in the first reference voiceprint information, and a second identifier corresponding to the second reference voiceprint information being the same as a first identifier corresponding to the first reference voiceprint information.

In step S32, the account management system determines whether first voice information in the first reference voiceprint information has higher than the quality of second voice information in the second reference voiceprint information. If the quality of first voice information in the first reference voiceprint information is higher than that of second voice information in the second reference voiceprint information, the account management system executes step S33; otherwise, the account management system executes step S35.

In step S33, the account management system deletes the second reference voiceprint information.

In step S34, the account management system stores the first reference voiceprint information and the corresponding first identifier.

In step S35, the account management system deletes the first reference voiceprint information.

In step S31, the search range for determining whether the second reference voiceprint information exists includes reference voiceprint information, which has been stored in the voiceprint library. The search range may also include reference voiceprint information that is generated synchronously with the first reference voiceprint information and has not yet been stored. If the second reference voiceprint information does not exist, then the first reference voiceprint information is stored. If the second reference voiceprint information exists, it indicates that at least two different pieces of voice information exist with regard to the same first user and the same text information, and then the quality of the first voice information in the first reference voiceprint information is compared with that of the second voice information in the second reference voiceprint information. If the quality of the first voice information is higher than that of the second voice information, the first reference voiceprint information is stored, and the second reference voiceprint information is deleted. If the quality of the first voice information is lower than that of the second voice information, the first reference voiceprint information is deleted. In doing so, with regard to the same text information, the voice information with higher quality is retained, thereby improving the accuracy of the comparison of voice information in an identity authentication process and reducing the comparison complexity.

In some embodiments, the voiceprint library may be updated to add reference voiceprint information of a new user, add reference voiceprint information with different text information corresponding to an existing user, or replace reference voiceprint information with a relatively low quality of voice information in the voiceprint library with reference voiceprint information with a higher quality of voice information.

In method 300, with regard to new reference voiceprint information obtained, it is determined whether another reference voiceprint information in which the text information and the corresponding identifier are the same as those in the reference voiceprint information has been stored, and if so, then the quality of voice information in the two pieces of reference voiceprint information is compared. Consequently, in the stored reference voiceprint information, text information in two pieces of reference voiceprint information corresponding to the same identifier (i.e., the same user) is different, and the voice information of higher quality corresponding to each text information is retained, thereby improving the authentication accuracy and authentication efficiency.

Figure 4:
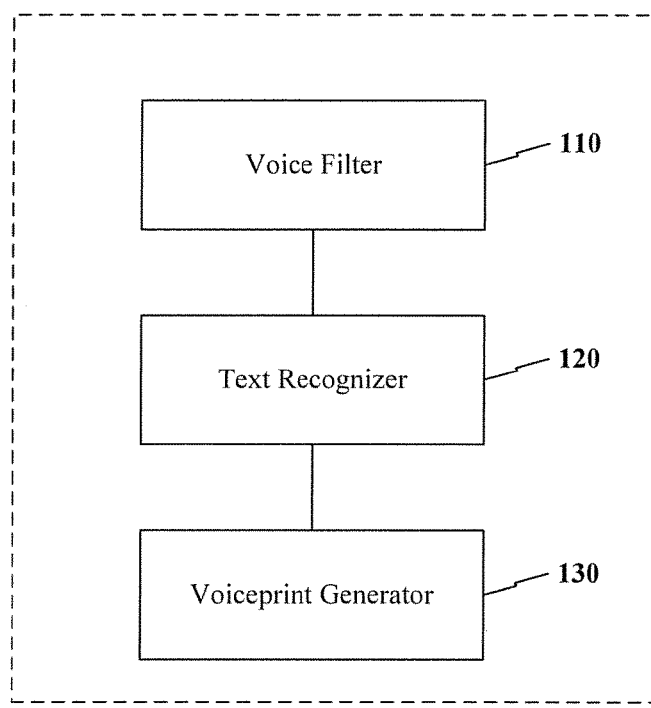
FIG. 4 is a block diagram of an exemplary system for generating voiceprint information, consistent with some embodiments of this disclosure.

FIG. 4 is a block diagram of an exemplary system 400 for generating voiceprint information, consistent with some embodiments of this disclosure. The system 400 can be implemented as a part of an account management system. Referring to FIG. 4, the system 400 includes a voice filter 110, a text recognizer 120 and a voiceprint generator 130.

The voice filter 110 is configured to acquire a historical voice file generated by a call between a first user and a second user, and execute filtering processing on the historical voice file to obtain voice information of the first user.

The text recognizer 120 is configured to execute text recognition processing on the voice information to obtain text information corresponding to the voice information.

The voiceprint generator 130 is configured to store the voice information and the corresponding text information as reference voiceprint information of the first user, and store an identifier of the first user.

Figure 5:
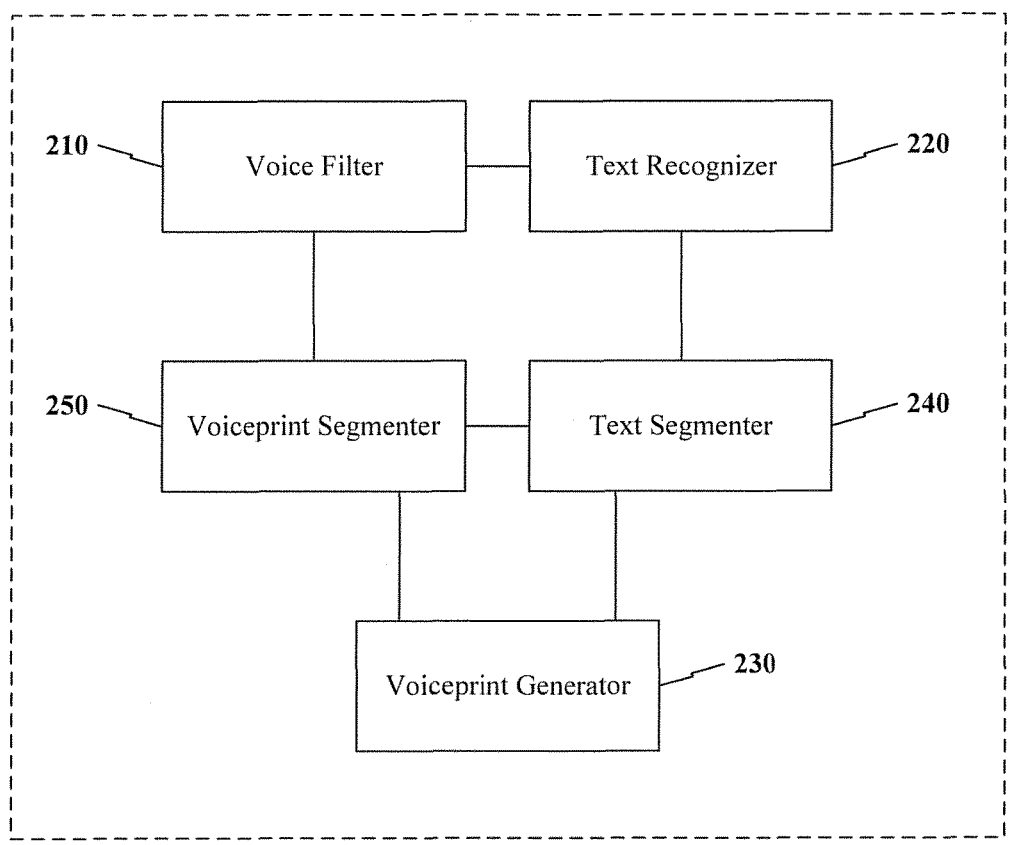
FIG. 5 is a block diagram of another exemplary system for generating voiceprint information, consistent with some embodiments of this disclosure.

FIG. 5 is a block diagram of another exemplary system 500 for generating voiceprint information, consistent with some embodiments of this disclosure. The system 500 can be implemented as a part of an account management system. Referring to FIG. 5, the system 500 includes a voice filter 210, a text recognizer 220, a text segmenter 240, a voiceprint segmenter 250, and a voiceprint generator 230.

The voice filter 210 is configured to acquire a historical voice file generated by a call between a first user and a second user, and execute filtering processing on the historical voice file to obtain voice information of the first user.

The text recognizer 220 is configured to execute text recognition processing on the voice information to obtain text information corresponding to the voice information.

The text segmenter 240 is configured to segment the text information into multiple pieces of sub-text information, and mark a start time and an end time of each piece of the sub-text information.

The voiceprint segmenter 250 is configured to acquire, according to the start time and the end time of the sub-text information, sub-voice information corresponding to each piece of the sub-text information from the voice information.

The voiceprint generator 230 is configured to store each pair of sub-voice information and sub-text information as a piece of reference voiceprint information of the first user, and store an identifier of the first user.

In some embodiments, in order to implement the function of storing the reference voiceprint information and the identifier of the first user, the voiceprint generator 130 or the voiceprint generator 230 above may be further configured to determine whether second reference voiceprint information exists in the voiceprint library. The second reference voiceprint information includes second text information that is the same as first text information in first reference voiceprint information to be stored. The second reference voiceprint information also includes a corresponding second identifier that is the same as a first identifier corresponding to the first reference voiceprint information. If the second reference voiceprint information does not exist in the voiceprint library, then the voiceprint generator 130 or the voiceprint generator 230 may be configured to store the first reference voiceprint information and the first identifier. If the second reference voiceprint information exists in the voiceprint library, then the voiceprint generator 130 or the voiceprint generator 230 may be configured to compare the quality of first voice information in the first reference voiceprint information with that of second voice information in the second reference voiceprint information. If the quality of the first voice information is lower than that of the second voice information, the voiceprint generator 130 or the voiceprint generator 230 may be configured to delete the first reference voiceprint information. If the quality of the first voice information is higher than that of the second voice information, the voiceprint generator 130 or the voiceprint generator 230 may be configured to delete the second reference voiceprint information, and store the first reference voiceprint information and the first identifier.

Based on the voiceprint generators configured as above, the embodiments of the present application not only can ensure that, in the stored reference voiceprint information, text information in any two pieces of reference voiceprint information corresponding to the same user is different, but also can ensure that the quality of voice information corresponding to each kind of text information is the highest; and thus when identity authentication is executed based on the embodiments of the present application, performing voiceprint comparison based on voice information with a higher quality can ensure the accuracy of authentication and improve the authentication efficiency.

Figure 6:
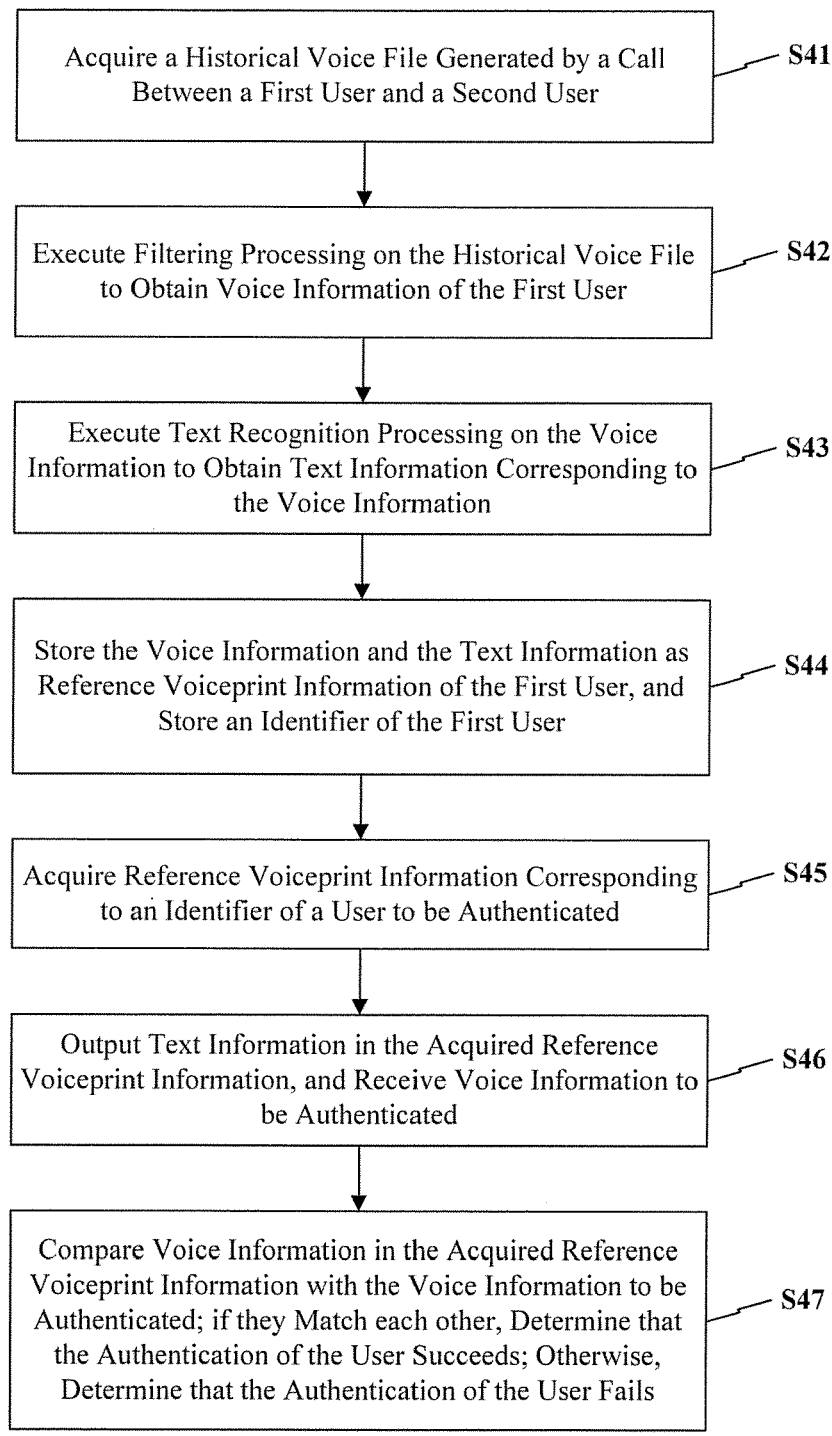
FIG. 6 is a flowchart of an exemplary method for identity authentication, consistent with some embodiments of this disclosure.

FIG. 6 is a flowchart of an exemplary method 600 for identity authentication, consistent with some embodiments of this disclosure. The method 600 may be performed by a system, such as an account management system. Referring to FIG. 6, the method 600 includes the following steps.

In step S41, the account management system acquires a historical voice file generated by a call between a first user and a second user. For example, the first user may be a registered user with a corresponding private account in the account management system, and the second user may be a service staff of the account management system.

In step S42, the account management system executes filtering processing on the historical voice file to obtain voice information of the first user.

In step S43, the account management system executes text recognition processing on the voice information to obtain text information corresponding to the voice information.

In step S44, the account management system stores the text information and the corresponding voice information as reference voiceprint information of the first user, and stores an identifier of the first user.

In step S45, the account management system acquires reference voiceprint information corresponding to an identifier of a user to be authenticated.

In step S46, the account management system outputs text information in the acquired reference voiceprint information, and receives voice information to be authenticated.

In step S47, the account management system compares voice information in the acquired reference voiceprint information with the voice information to be authenticated. If the voice information in the acquired reference voiceprint information matches with the voice information to be authenticated, then the account management system determines that the authentication of the user succeeds. If the voice information in the acquired reference voiceprint information does not match with the voice information to be authenticated, then the account management system determines that the authentication of the user fails.

In the method 600, the text information and the voice information in the reference voiceprint information are both obtained on the basis of the historical voice file, rather than being pre-set by the account management system. As a result, the text information and the voice information in the reference voiceprint information are not disclosed, and neither the first user nor any other user would foresee the specific content of text information which needs to be read during identity authentication and play a voice file which has been recorded in advance. Therefore, the method 600 improves accuracy of the authentication result and security of user accounts in identity authentication.

Figure 7:
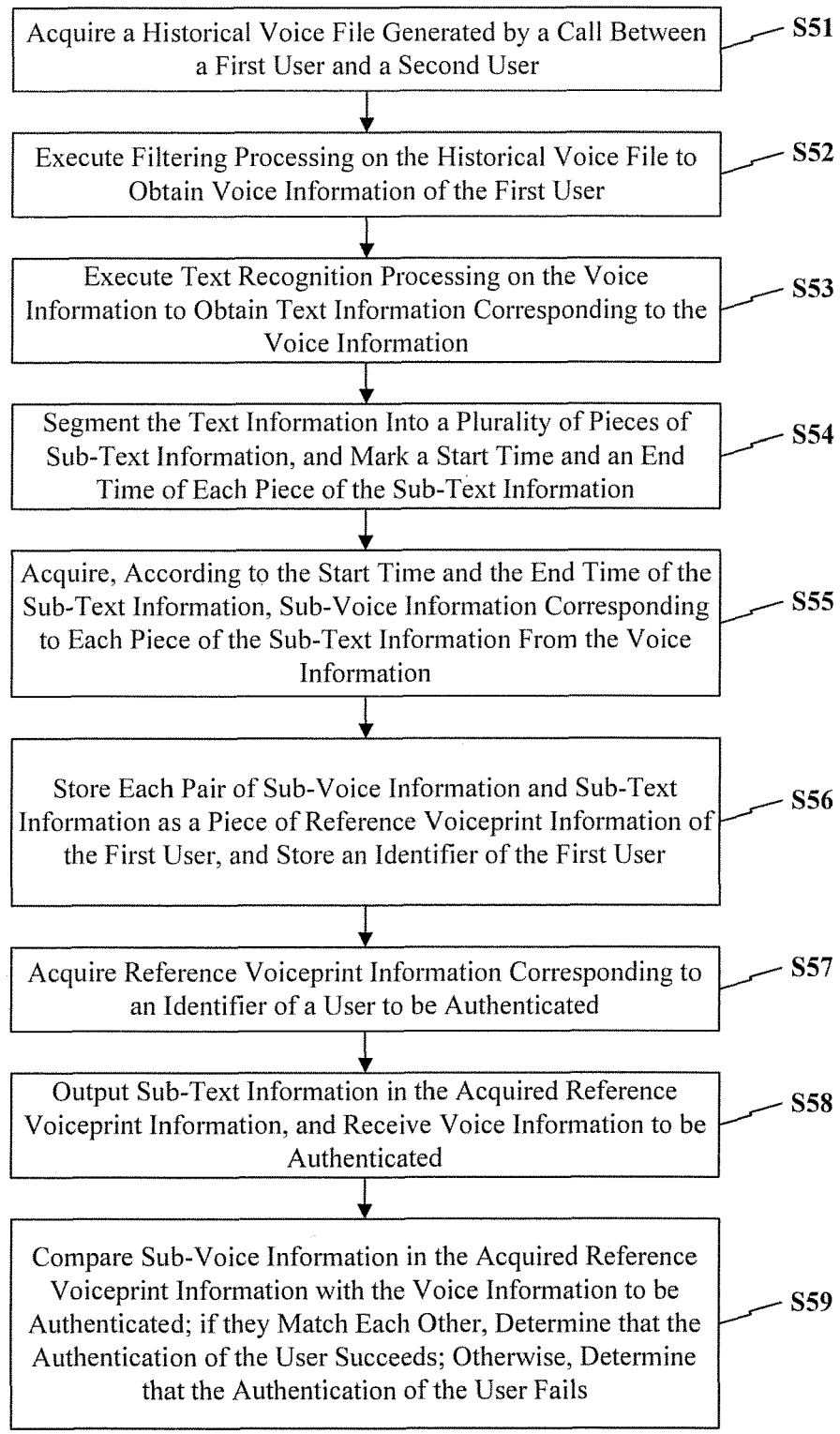
FIG. 7 is a flowchart of another exemplary method for identity authentication, consistent with some embodiments of this disclosure.

FIG. 7 is a flowchart of another exemplary method 700 for identity authentication, consistent with some embodiments of this disclosure. The method 700 may be performed by a system, such as an account management system. Referring to FIG. 7, the method 700 includes the following steps.

In step S51, the account management system acquires a historical voice file generated by a call between a first user and a second user.

In step S52, the account management system executes filtering processing on the historical voice file to obtain voice information of the first user.

In step S53, the account management system executes text recognition processing on the voice information to obtain text information corresponding to the voice information.

In step S54, the account management system segments the text information into multiple pieces of sub-text information, and marks a start time and an end time of each piece of the sub-text information.

In step S55, the account management system acquires, according to the start time and the end time of the sub-text information, sub-voice information corresponding to each piece of the sub-text information from the voice information.

In step S56, the account management system stores each pair of sub-voice information and sub-text information as a piece of reference voiceprint information of the first user, and stores an identifier of the first user.

In step S57, the account management system acquires reference voiceprint information corresponding to an identifier of a user to be authenticated.

In step S58, the account management system outputs sub-text information in the acquired reference voiceprint information, and receives voice information to be authenticated.

In step S59, the account management system compares sub-voice information in the acquired reference voiceprint information with the voice information to be authenticated. If the sub-voice information in the acquired reference voiceprint information matches with the voice information to be authenticated, the account management system determines that the authentication of the user succeeds. If the sub-voice information in the acquired reference voiceprint information does not match with the voice information to be authenticated, the account management system determines that the authentication of the user fails.

In the method 700, multiple pieces of reference voiceprint information are stored for the first user, and when identity authentication needs to be executed, one piece of the multiple pieces of reference voiceprint information may be selected randomly. Accordingly, the specific content of text information that a user to be authenticated needs to read cannot be foreseen, thereby improving the accuracy of the authentication result and the security of an account. In addition, in the method 700, sub-text information in each piece of reference voiceprint information is relatively simple, which can reduce the time required for reading the text information, reduce the time consumed by voiceprint comparison, and improve the authentication efficiency.

The method 600 or 700 can also adopt the method 300 described in connection with FIG. 3 to implement the storage of reference voiceprint information. In doing so, in the stored reference voiceprint information, text information in two pieces of reference voiceprint information corresponding to the same user is different, and the voice information of higher quality corresponding to each text information is retained, thereby improving the accuracy of authentication and authentication efficiency.

Figure 8:
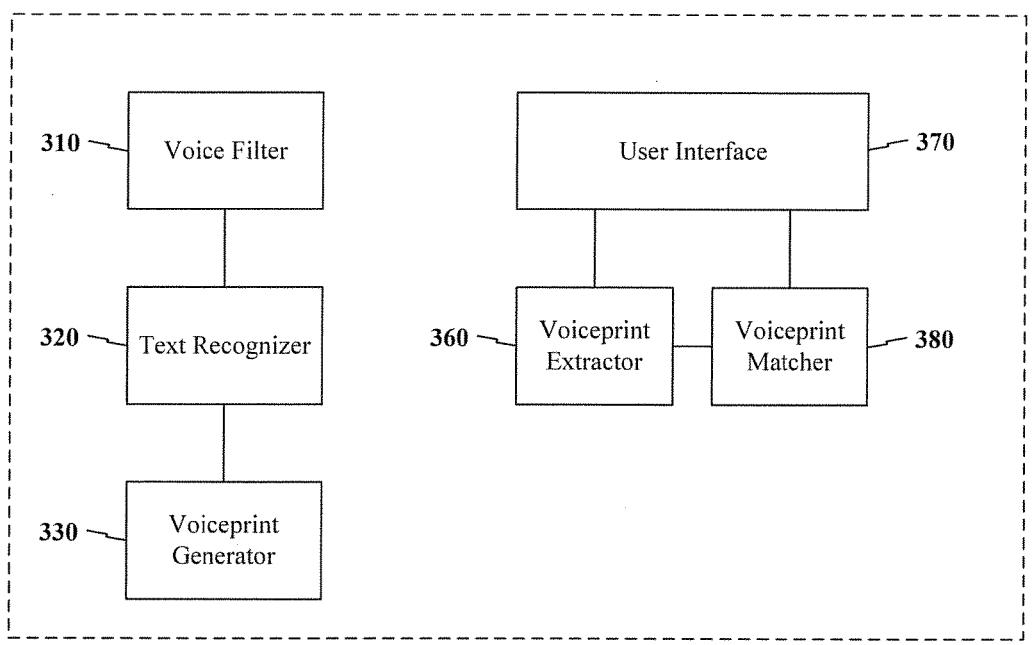
FIG. 8 is a block diagram of an exemplary system for identity authentication, consistent with some embodiments of this disclosure.

FIG. 8 is a block diagram of an exemplary system 800 for identity authentication, consistent with some embodiments of this disclosure. The system 800 may be implemented as a part of an account management system. Referring to FIG. 8, the system 800 includes a voice filter 310, a text recognizer 320, a voiceprint generator 330, a voiceprint extractor 360, a user interface 370, and a voiceprint matcher 380.

The voice filter 310 is configured to acquire a historical voice file generated by a call between a first user and a second user, and execute filtering processing on the historical voice file to obtain voice information of the first user.

The text recognizer 320 is configured to execute text recognition processing on the voice information to obtain text information corresponding to the voice information.

The voiceprint generator 330 is configured to store the voice information and the corresponding text information as reference voiceprint information of the first user, and store the an identifier of the first user.

The voiceprint extractor 360 is configured to acquire reference voiceprint information corresponding to an identifier of a user to be authenticated.

The user interface 370 is configured to output text information in the acquired reference voiceprint information, and receive voice information to be authenticated.

The voiceprint matcher 380 is configured to compare voice information in the acquired reference voiceprint information with the voice information to be authenticated. If the voice information in the acquired reference voiceprint information matches with the voice information to be authenticated, the voiceprint matcher 380 is configured to determine that the authentication of the user succeeds. If the voice information in the acquired reference voiceprint information does not match with the voice information to be authenticated, the voiceprint matcher 380 is configured to determine that the authentication of the user to be authenticated fails.

In the system 800, the user interface 370 is used for implementing the interaction between the identity authentication system and the user to be authenticated. In addition to outputting the text information in the reference voiceprint information acquired by the voiceprint extractor 360 and receiving voice information to be authenticated which is input by the user to be authenticated, the user interface 370 can also be configured to receive an identity authentication request of the user, trigger the voiceprint extractor 360 after receiving the identity authentication request, and output an authentication result obtained by the voiceprint matcher 380 to the user.

It can be seen from the above structure that the embodiments of the present application involve filtering a historical voice file stored in a relevant system to obtain voice information of a first user, obtaining text information corresponding to the voice information by means of text recognition processing, and editing the voice information and the corresponding text information into reference voiceprint information of the first user. Since the text information and the voice information in the reference voiceprint information are both obtained on the basis of the historical voice file mentioned above, rather than being pre-set by the relevant system, i.e., are not disclosed, neither the first user nor the second user nor any other user would foresee the specific content of text information which needs to be reread when identity authentication is executed, thereby being unable to record a corresponding voice file in advance, and thus being also unable to achieve the objective of successful authentication by playing a voice file which has been recorded in advance. Therefore, in comparison with the existing voiceprint recognition-based identity authentication method, identity authentication is performed based on the voiceprint information management method provided by the embodiments of the present application, the authentication result is more accurate, no potential security hazard exists, and the security of an account is higher.

Figure 9:
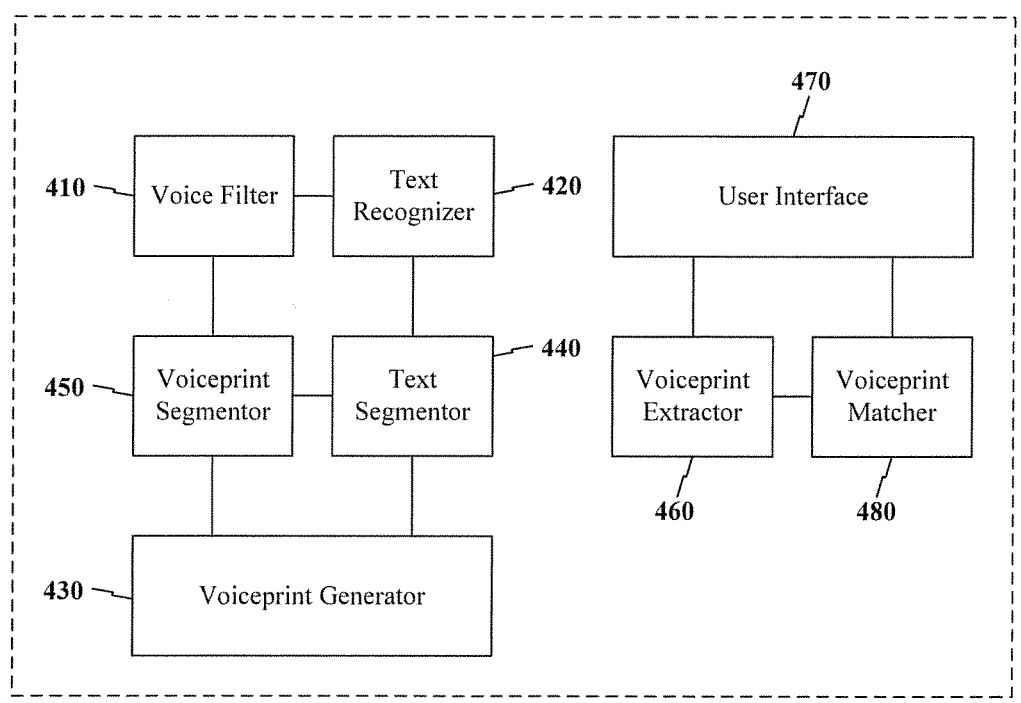
FIG. 9 is a block diagram of another exemplary system for identity authentication, consistent with some embodiments of this disclosure.

FIG. 9 is a block diagram of another exemplary system 900 for identity authentication, consistent with some embodiments of this disclosure. The system 900 may be implemented as a part of an account management system. Referring to FIG. 9, the system 900 includes a voice filter 410, a text recognizer 420, a text segmenter 440, a voiceprint segmenter 450, a voiceprint generator 430, a voiceprint extractor 460, a user interface 470, and a voiceprint matcher 480.

The voice filter 410 is configured to acquire a historical voice file generated by a call between a first user and a second user, and execute filtering processing on the historical voice file to obtain voice information of the first user.

The text recognizer 420 is configured to execute text recognition processing on the voice information to obtain text information corresponding to the voice information.

The text segmenter 440 is configured to segment the text information into multiple pieces of sub-text information, and mark a start time and an end time of each piece of the sub-text information.

The voiceprint segmenter 450 is configured to acquire, according to the start time and the end time of the sub-text information, sub-voice information corresponding to each piece of the sub-text information from the voice information.

The voiceprint generator 430 is configured to store each pair of sub-voice information and sub-text information as a piece of reference voiceprint information of the first user, and an identifier of the first user.

The voiceprint extractor 460 is configured to acquire reference voiceprint information corresponding to an identifier of a user to be authenticated.

The user interface 470 is configured to output sub-text information in the acquired reference voiceprint information, and receive voice information to be authenticated.

The voiceprint matcher 480 is configured to compare sub-voice information in the acquired reference voiceprint information with the voice information to be authenticated. If the sub-voice information in the acquired reference voiceprint information matches with the voice information to be authenticated, the voiceprint matcher 480 is configured to determine that the authentication of the user succeeds. If the sub-voice information in the acquired reference voiceprint information does not match with the voice information to be authenticated, the voiceprint matcher 480 is configured to determine that the authentication of the user fails.

It can be seen from the above structure that the embodiments of the present application involve segmenting the text information obtained by recognition into a plurality of pieces of sub-text information, cutting out corresponding sub-voice information according to the start time and the end time thereof, and editing each piece of sub-text information and the corresponding sub-voice information into one piece of reference voiceprint information, so that the first user has a plurality of pieces of reference voiceprint information; and when identity authentication needs to be executed, determining a plurality of corresponding pieces of reference voiceprint information according to an identifier corresponding to a user to be authenticated, and randomly selecting one piece therefrom for the present identity authentication. Since reference voiceprint information acquired when identity authentication is executed is random, the specific content of text information that a user to be authenticated needs to reread cannot be foreseen, and it is impossible to record a corresponding voice file in advance, and to achieve the objective of successful authentication by playing a voice file which has been recorded in advance. Therefore, the identity authentication system provided by the present embodiment can ensure the accuracy of the authentication result, and improve the security of an account. In addition, in the present embodiment, sub-text information in each piece of reference voiceprint information is simple and short, which can reduce the time required for rereading the text information, reduce the time consumed by voiceprint comparison, and improve the authentication efficiency.

In some embodiments, the voiceprint generator 330 or the voiceprint generator 430 above can be further configured to determine whether second reference voiceprint information exists in the voiceprint library. The second reference voiceprint information includes second text information that is the same as first text information in first reference voiceprint information to be stored. The second reference voiceprint information also includes a second identifier that is the same as a first identifier corresponding to the first reference voiceprint information. If the second reference voiceprint information does not exist, then the voiceprint generator 330 or the voiceprint generator 430 stores the first reference voiceprint information and the identifier of the first user. If the second reference voiceprint information exists, then the voiceprint generator 330 or the voiceprint generator 430 compares the quality of first voice information in the first reference voiceprint information with that of second voice information in the second reference voiceprint information. If the quality of the first voice information is lower than that of the second voice information, then the voiceprint generator 330 or the voiceprint generator 430 deletes the first reference voiceprint information. If the quality of the first voice information is higher than that of the second voice information, then the voiceprint generator 330 or the voiceprint generator 430 deletes the second reference voiceprint information, and stores the first reference voiceprint information and the corresponding user identifier.

It should be understood by those skilled in the art that the above described units and modules can each be implemented through hardware, or software, or a combination of hardware and software for allowing a specialized device to perform the functions described above. If implemented by software, it may be stored in the computer-readable medium.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for generating voiceprint information, comprising:
  acquiring a plurality of historical voice files generated by a plurality of calls between a first user and one or more second users;

executing filtering processing on the plurality of historical voice files to obtain voice information of the first user, wherein the voice information includes a plurality of pieces of reference voiceprint information of the first user;

executing text recognition processing on the plurality of pieces of reference voiceprint information to obtain text information corresponding to the plurality of pieces of reference voiceprint information; and storing an identifier of the first user and the plurality of pieces of reference voiceprint information and the corresponding text information;

wherein a randomly selected piece of the reference voiceprint information is sufficient for authenticating the first user.

2. The method according to claim 1, further comprising:
segmenting the text information into a plurality of pieces of sub-text information;
marking a start time and an end time of each piece of the sub-text information; and
acquiring, according to the start time and the end time of the sub-text information, sub-voice information corresponding to each piece of the sub-text information from the voice information.

3. The method according to claim 2, wherein storing the plurality of pieces of reference voiceprint information and the corresponding text information comprises:
storing each pair of sub-voice information and sub-text information as a piece of reference voiceprint information of the first user.

4. The method according to claim 1, wherein storing the reference voiceprint information and the identifier of the first user comprises:
determining whether second reference voiceprint information exists in a voiceprint library, wherein the second reference voiceprint information includes second text information and second identifier, the second text info nation is the same as the text information in the reference voiceprint information, and the second identifier is the same as the identifier of the first user;
in response to the second reference voiceprint information existing in the voiceprint library, comparing a quality of the voice information in the reference voiceprint information with a quality of second voice information in the second reference voiceprint information;
in response to the quality of the voice information being lower than the quality of the second voice information, deleting the reference voiceprint information; and
in response to the quality of the voice information is higher than the quality of the second voice information, deleting the second reference voiceprint information.

5. A system for generating voiceprint information, comprising:
a voice filter configured to acquire a plurality of historical voice files generated by a plurality of calls between a first user and one or more second users and execute filtering processing on the plurality of historical voice files to obtain voice information of the first user, wherein the voice information includes a plurality of pieces of reference voiceprint information of the first user;
a text recognizer configured to execute text recognition processing on the plurality of pieces of reference voiceprint information to obtain text information corresponding to the plurality of pieces of reference voiceprint information; and a voiceprint generator configured to store the plurality of pieces of reference voiceprint information and the corresponding text information;
wherein a randomly selected piece of the reference voiceprint information is sufficient for authenticating the first user.

6. The system according to claim 5, further comprising:
a text segmenter configured to segment the text information into a plurality of pieces of sub-text information, and mark a start time and an end time of each piece of the sub-text information; and
a voiceprint segmenter configured to acquire, according to the start time and the end time of the sub-text information, sub-voice information corresponding to each piece of the sub-text information from the voice information.

7. The system according to claim 6, wherein the voiceprint generator is further configured to store each pair of sub-voice information and sub-text information as a piece of reference voiceprint information of the first user.

8. The system according to claim 5, wherein the voiceprint generator is further configured to:
determine whether second reference voiceprint information exists in a voiceprint library, wherein the second reference voiceprint information includes second text information and second identifier, the second text information is the same as the text information in the reference voiceprint information, and the second identifier is the same as the identifier of the first user;
in response to the second reference voiceprint information existing in the voiceprint library, comparing a quality of the voice information in the reference voiceprint information with a quality of second voice information in the second reference voiceprint information;
in response to the quality of the voice information being lower than the quality of the second voice information, delete the reference voiceprint information; and
in response to the quality of the voice information being higher than the quality of the second voice information, delete the second reference voiceprint information.

9. An identity authentication method, comprising:
acquiring a plurality of historical voice files generated by a call between a first user and one or more second users;
filtering processing on the plurality of historical voice files to obtain voice information of the first user wherein the voice information includes a plurality of pieces of reference voiceprint information of the first user;
text recognition processing on the plurality of pieces of reference voiceprint information of the first user to obtain text information corresponding to the plurality of pieces of reference voiceprint information of the first user;
storing an identifier of the first user and the plurality of pieces of reference voiceprint information and the corresponding text information;
acquiring one of the plurality of pieces of reference voiceprint information corresponding to an identifier of a user to be authenticated;
outputting text information in the acquired reference voiceprint information, and receiving voice information to be authenticated;
comparing voice information in the acquired reference voiceprint information with the voice information to be authenticated;
in response to the voice information in the acquired reference voiceprint information matching with the voice information to be authenticated, determining that the authentication of the user succeeds; and in response to the voice information in the acquired reference voiceprint information not matching with the voice information to be authenticated, determining that the authentication of the user fails;

wherein a randomly selected piece of the reference voiceprint information is sufficient for authenticating the first user.

10. The identity authentication method according to claim 9, further comprising: segmenting the text information into a plurality of pieces of sub-text information; marking a start time and an end time of each piece of the sub-text information; and acquiring, according to the start time and the end time of the sub-text information, sub-voice information corresponding to each piece of the sub-text information from the voice information.

11. The identity authentication method according to claim 10, wherein storing the plurality of pieces of reference voiceprint information and the corresponding text information comprises:

storing each pair of sub-voice information and sub-text information as a piece of reference voiceprint information of the first user.

12. The identity authentication method according to claim 9, wherein storing the reference voiceprint information and the identifier of the first user comprises:

determining whether second reference voiceprint information exists in a voiceprint library, wherein the second reference voiceprint information includes second text information and second identifier, the second text information is the same as the text information in the reference voiceprint information, and the second identifier is the same as the identifier of the first user;

if the second reference voiceprint information exists in the voiceprint library, comparing a quality of the voice information in the reference voiceprint information with a quality of second voice information in the second reference voiceprint information;

if the quality of the voice information is lower than the quality of the second voice information, deleting the reference voiceprint information; and if the quality of the voice information is higher than the quality of the second voice information, deleting the second reference voiceprint information.

13. An identity authentication system, comprising:

a voice filter configured to acquire a plurality of historical voice files generated by a plurality of calls between a first user and one or more second users, and execute filtering processing on the plurality of historical voice files to obtain voice information of the first user, wherein the voice information includes a plurality of pieces of reference voiceprint information of the first user;

a text recognizer configured to execute text recognition processing on the plurality of pieces of reference voiceprint information to obtain text information corresponding to the plurality of pieces of reference voiceprint information;

a voiceprint generator configured to store the plurality of pieces of reference voiceprint information and the corresponding text information, and store an identifier of the first user;

a voiceprint extractor configured to acquire one of the plurality of pieces of reference voiceprint information corresponding to an identifier of a user to be authenticated;

a user interface configured to output text information in the acquired reference voiceprint information, and receive voice information to be authenticated; and a voiceprint matcher configured to compare voice information in the acquired reference voiceprint information with the voice information to be authenticated, the voiceprint matcher further configured to determine that the authentication of the user succeeds if the voice information in the acquired reference voiceprint information matches with the voice information to be authenticated, and determine that the authentication of the user fails if the voice information in the acquired reference voiceprint information does not match with the voice information to be authenticated;

wherein a randomly selected piece of the reference voiceprint information is sufficient for authenticating the first user.

14. The identity authentication system according to claim 13, further comprising:

a text segmenter configured to segment the text information into a plurality of pieces of sub-text information, and mark a start time and an end time of each piece of the sub-text information; and a voiceprint segmenter configured to acquire, according to the start time and the end time of the sub-text information, sub-voice information corresponding to each piece of the sub-text information from the voice information.

15. The identity authentication system according to claim 14, wherein the voiceprint generator is further configured to store each pair of sub-voice information and sub-text information as a piece of reference voiceprint information of the first user.

16. The identity authentication system according to claim 13, wherein the voiceprint generator is further configured to:

determine whether second reference voiceprint information exists in a voiceprint library, wherein the second reference voiceprint information includes second text information and second identifier, the second text information is the same as the text information in the reference voiceprint information, and the second identifier is the same as the identifier of the first user;

if the second reference voiceprint information exists in the voiceprint library, compare a quality of the voice information in the reference voiceprint information with a quality of second voice information in the second reference voiceprint information;

if the quality of the voice information is lower than the quality of the second voice information, delete the reference voiceprint information; and if the quality of the voice information is higher than the quality of the second voice information, delete the second reference voiceprint information.

17. A non-transitory computer readable medium that stores a set of instructions that is executable by at least one processor of a system to cause the system to perform a method for generating voiceprint information, the method comprising:

acquiring a plurality of historical voice files generated by a plurality of calls between a first user and one or more second users;

executing filtering processing on the plurality of historical voice files to obtain voice information of the first user, wherein the voice information includes a plurality of pieces of reference voiceprint information of the first user;

executing text recognition processing on the plurality of pieces of reference voiceprint information to obtain text information corresponding to the plurality of pieces of reference voiceprint information; and storing an identifier of the first user and the plurality of pieces of reference voiceprint information and the corresponding text information;

wherein a randomly selected piece of the reference voiceprint information is sufficient for authenticating the first user.

18. The non-transitory computer readable medium of claim 17, wherein the set of instructions that is executable by the at least one processor of the system to cause the system to further perform:

segmenting the text information into a plurality of pieces of sub-text information;

marking a start time and an end time of each piece of the sub-text information; and acquiring, according to the start time and the end time of the sub-text information, sub-voice information corresponding to each piece of the sub-text information from the voice information.

19. The non-transitory computer readable medium of claim 18, wherein the set of instructions that is executable by the at least one processor of the system to cause the system to further perform:

storing each pair of sub-voice information and sub-text information as a piece of reference voiceprint information of the first user.

20. The non-transitory computer readable medium of claim 17, wherein the set of instructions that is executable by the at least one processor of the system to cause the system to further perform:

determining whether second reference voiceprint information exists in a voiceprint library, wherein the second reference voiceprint information includes second text information and second identifier, the second text information is the same as the text information in the reference voiceprint information, and the second identifier is the same as the identifier of the first user;

in response to the second reference voiceprint information existing in the voiceprint library, comparing a quality of the voice information in the reference voiceprint information with a quality of the second voice information in the second reference voiceprint information;

in response to the quality of the voice information being lower than the quality of second voice information, deleting the reference voiceprint information; and in response to the quality of the voice information is higher than the quality of the second voice information, deleting the second reference voiceprint information.

21. A non-transitory computer readable medium that stores a set of instructions that is executable by at least one processor of a system to cause the system to perform a method for identity authentication, the method comprising:

acquiring a plurality of historical voice files generated by a plurality of calls between a first user and one or more second users;

filtering processing on the plurality of historical voice files to obtain voice information of the first user, wherein the voice information includes a plurality of pieces of reference voiceprint information of the first user;

text recognition processing on the plurality of pieces of reference voiceprint information of the first user to obtain text information corresponding to the plurality of pieces of reference voiceprint information of the first user;

storing an identifier of the first user and the plurality of pieces of reference voiceprint information and the corresponding text information;

acquiring one of the plurality of pieces of reference voiceprint information corresponding to an identifier of a user to be authenticated;

outputting text information in the acquired reference voiceprint information, and receiving voice information to be authenticated;

comparing voice information in the acquired reference voiceprint information with the voice information to be authenticated;

in response to the voice information in the acquired reference voiceprint information matching with the voice information to be authenticated, determining that the authentication of the user succeeds; and in response to the voice information in the acquired reference voiceprint information not matching with the voice information to be authenticated, determining that the authentication of the user fails;

wherein a randomly selected piece of the reference voiceprint information is sufficient for authenticating the first user.

22. The non-transitory computer readable medium of claim 21, wherein the set of instructions that is executable by the at least one processor of the system to cause the system to further perform:

segmenting the text information into a plurality of pieces of sub-text information; marking a start time and an end time of each piece of the sub-text information; and acquiring, according to the start time and the end time of the sub-text information, sub-voice information corresponding to each piece of the sub-text information from the voice information.

23. The non-transitory computer readable medium of claim 22, wherein the set of instructions that is executable by the at least one processor of the system to cause the system to further perform:

storing each pair of sub-voice information and sub-text information as a piece of reference voiceprint information of the first user.

24. The non-transitory computer readable medium of claim 21, wherein the set of instructions that is executable by the at least one processor of the system to cause the system to further perform:

determining whether second reference voiceprint information exists in a voiceprint library, wherein the second reference voiceprint information includes second text information and second identifier, the second text information is the same as the text information in the reference voiceprint information, and the second identifier is the same as the identifier of the first user;

if the second reference voiceprint information exists in the voiceprint library, comparing a quality of the voice information in the reference voiceprint information with a quality of second voice information in the second reference voiceprint information;

if the quality of the voice information is lower than the quality of the second voice information, deleting the reference voiceprint information; and if the quality of the voice information is higher than the quality of the second voice information, deleting the second reference voiceprint information.

* * * * *

UNITED STATES PATENT AND TRADEMARK OFFICE
CERTIFICATE OF CORRECTION

PATENT NO. : 10,593,334 B2
APPLICATION NO. : 15/484082
DATED : March 17, 2020
INVENTOR(S) : Jian Xiong It is certified that error appears in the above-identified patent and that said Letters Patent is hereby corrected as shown below:

In the Claims

Claim 4, Column 15, Lines 38-39, "info nation" should read --information--.

Signed and Sealed this
Twenty-first Day of November, 2023

Katherine Kelly Vidal
*Director of the United States Patent and Trademark Office*